(12) United States Patent
Inoa et al.

(10) Patent No.: US 10,910,978 B2
(45) Date of Patent: Feb. 2, 2021

(54) INITIAL POSITION OFFSET DETECTION APPARATUS AND METHOD FOR CALIBRATING PERMANENT MAGNET MOTORS

(71) Applicants: Ernesto Inoa, Glendora, CA (US); Yujiang Wu, La Verne, CA (US); Justim William V. Jones, Irvine, CA (US)

(72) Inventors: Ernesto Inoa, Glendora, CA (US); Yujiang Wu, La Verne, CA (US); Justim William V. Jones, Irvine, CA (US)

(*) Notice: Subject to any disclaimer, the term of this patent is extended or adjusted under 35 U.S.C. 154(b) by 0 days.

(21) Appl. No.: 16/198,352

(22) Filed: Nov. 21, 2018

(65) Prior Publication Data
US 2020/0382033 A1  Dec. 3, 2020

Related U.S. Application Data

(60) Provisional application No. 62/715,009, filed on Aug. 6, 2018.

(51) Int. Cl.
*H02P 21/18* (2016.01)
*H02P 21/22* (2016.01)

(52) U.S. Cl.
CPC ............. *H02P 21/18* (2016.02); *H02P 21/22* (2016.02); *H02P 2207/05* (2013.01)

(58) Field of Classification Search
None
See application file for complete search history.

(56) References Cited

U.S. PATENT DOCUMENTS

| 5,369,342 | A | * | 11/1994 | Rudzewicz | ........ | B60H 1/00814 |
| | | | | | | 318/102 |
| 7,853,359 | B2 | * | 12/2010 | Ban | ........... | B25J 9/1692 |
| | | | | | | 700/263 |
| 2006/0131293 | A1 | * | 6/2006 | Kaufman | ........... | B23K 9/124 |
| | | | | | | 219/137.71 |
| 2011/0001444 | A1 | * | 1/2011 | Krause | .......... | H02P 23/14 |
| | | | | | | 318/400.06 |

* cited by examiner

*Primary Examiner* — Bentsu Ro
(74) *Attorney, Agent, or Firm* — The Law Office of Kevin M. Welch; Kevin Matthew Welch

(57) ABSTRACT

A low cost and efficient method and apparatus for calibrating high performance internal permanent magnet motors that involves starting from an initial estimation of the rotor position and improving the estimation incrementally by successively commanding various current vectors and making adjustments to the estimated initial position according to the rotor's physical reaction to such current vectors.

2 Claims, 6 Drawing Sheets

INITIAL POSITION OFFSET DETECTION APPARATUS AND METHOD FOR CALIBRATING PERMANENT MAGNET MOTORS

CROSS-REFERENCE TO RELATED APPLICATIONS

This United States Non-Provisional Utility Patent Application claims the priority date of U.S. Provisional Application No. 62/715,009, titled: "INITIAL POSITION OFFSET AUTO DETECTION FOR PERMANENT MAGNET MOTORS," filed Jul. 13, 2018 in the United States Patent and Trademark Office, the disclosure of which is hereby incorporated by reference in its entirety.

FIELD OF THE PRESENT DISCLOSURE

This disclosure relates generally to electric motor technology and more specifically to an innovative and cost efficient apparatus and method for accurately determining the relative position of the rotor to the stator in an internal permanent magnet motor for initial calibration purposes in high performance applications.

BACKGROUND OF THE RELATED ART

When manufacturing internal permanent magnet motors that utilize field oriented controls for high-performance applications, such as electric vehicles, it is critically important that the angular position of the rotor's magnetic flux in relation to the stator is determined with a high degree of accuracy. During the manufacturing assembly process, the initial position of the rotor in relation to the stator is often estimated. Subsequently, it is typical for a position sensor such as a Resolver to be affixed to the rotor based on this estimation.

While modern technology can improve the accuracy with which such initial position estimations are made, even the most accurate estimations are often not accurate enough for high-performance applications; therefore, after assembly, it is usually necessary to calibrate the internal permanent magnet motor by determining the error between the initial estimated position of the rotor and the true position of the rotor's magnetic flux in relation to the stator.

Such calibration procedures have been approached several different ways. Many of the legacy approaches are very accurate and capable of achieving their designed purpose but are also unduly complex which increases the time and costs associated with calibration, and more importantly, such complexities increase the cost of the end product.

For example, U.S. Pat. No. 9,175,984 discloses the use of a Least Square Analysis calculation which is a complex calculation that consumes considerable computational resources, and U.S. Pat. No. 7,885,785 requires installing extra hardware to the end product, specifically, a piezoelectric sensor. Permanent hardware additions are undesirable because they typically increase the size, cost, and complexity of the end product.

Other exemplary legacy solutions include U.S. Pat. Nos. 8,853,979 and 8,018,187, both of which disclose the use of high-frequency current perturbation. This solution requires additional engineering and computing resources for designing and executing complex algorithms. Similarly, U.S. Pat. No. 9,160,264 discloses an approach that requires the end product to be driven into saturation, requiring complex calculations that consume valuable engineering resources.

However, accurate calibration is critically important to high-performance field oriented controlled internal permanent magnet motors, so with the continued demand to reduce costs and increase performance, there exists a need for simpler and more efficient approaches to calibration; approaches that are not unnecessarily complex and do not consume excessive engineering time and/or other computational resources so that manufacturers can produce high-quality products while reducing production times and the workload of calibration engineers.

The present disclosure distinguishes over the related art providing heretofore unknown advantages as described in the following summary.

BRIEF SUMMARY OF THE INVENTION

The present disclosure describes an innovative and cost-efficient apparatus and method for accurately determining the true position of the rotor in relation to the stator in an interior mounted permanent magnet motor for initial calibration purposes in high-performance applications.

The presently disclosed apparatus includes a controller that is in electrical communication with a power source and a position sensor, such that the apparatus is capable of commanding a successive series of current vectors and receiving feedback regarding the rotor's physical response to such current vectors via the position sensor. By incrementally adjusting the estimation of the rotor's true position in accord with the rotor's physical response to each previous current vector commanded, the presently disclosed apparatus is able to quickly and efficiently hone in on the precise position of the rotor's magnetic flux in relation to the stator with accuracy suffice for calibration in high performance application.

The true rotor position ($\theta_{foc}$) is ultimately determined through this iterative process. By incrementally adjusting the estimation of the position error angle ($\theta_{offset}$) with each successive current vector commanded depending on the feedback regarding the rotor's physical response the error estimation becomes more accurate, and because $\theta_{foc}=\theta_{sensor}+\theta_{offset}$, when the error calculation ($\theta_{offset}$) is incrementally improved with each iteration, the true rotor position calculation ($\theta_{foc}$) is incrementally improved as well.

The apparatus and method begins by assuming the initial estimated stator position is perfectly accurate, therefore, the controller assumes the position sensor ($\theta_{sensor}$) is equal to the true field oriented control rotor position ($\theta_{foc}$) and the error angle between the two is zero ($\theta_{offset}=0$). The motor is then stimulated by commanding a non-zero d-axis current of a magnitude that is below the magnitude that will excite the bifurcation case for the particular motor and the rotor's physical response according to the position sensor is reported back to the controller.

Depending on the polarity of the non-zero d-axis current, the estimated error ($\theta_{offset}$) is then either increased or decreased by a preset variable $\Delta\theta$. For example, when using a negative non-zero d-axis current, $\theta_{offset}$ would be increased by $\Delta\theta$ if the rotor exhibited positive angular velocity and $\theta_{offset}$ would be decreased by $\Delta\theta$ if the rotor exhibited negative angular velocity. The reverse is true if positive non-zero d-axis current is initially commanded.

The variable $\Delta\theta$ can be assigned any value between 0° and 180°, however, through modeling and beta testing of the presently disclosed apparatus and method, it has been determined that a $\Delta\theta$ value in the range of 300 is preferred. The value of Δθ may be further optimized for a particular motor or according to the accuracy of a particular assembly process.

This procedure continues by commanding the same non-zero d-axis current again and adjusting $\theta_{offset}$ by Δθ according to the angular velocity exhibited by the rotor as before until the rotor exhibits an angular velocity of the opposite polarity as the previous iteration. At which time, Δθ is then reduced by a fixed percentage and the iterative process continues adjusting the error angle ($\theta_{offset}$) accordingly by the newly reduced value of Δθ. The fixed percentage by which Δθ is reduced can be any percentage smaller than one hundred percent; however, through modeling and beta testing it was determined that reduction percentage fifty percent works well. This variable can be optimized for efficiency as well.

The procedure will then continue using the newly reduced value of Δθ, successively commanding the same non-zero d-axis current until an iteration once again causes the rotor to exhibit angular velocity of an opposing polarity as the previous iteration. As before, Δθ will then be further reduced by the fixed percentage, and the successive iterations will continue using the newly further reduced Δθ.

After some number of iterations, the rotor will exhibit no angular velocity at all when the non-zero d-axis current is commanded. At this point, one of two cases is being expressed. Either the rotor position as determined by the position sensor ($\theta_{sensor}$) adjusted by the error angle ($\theta_{offset}$) is accurately describing the true position of the rotor's magnetic flux ($\theta_{foc}$) and the motor is fully calibrated, or the calculation is off by exactly 180°. To determine which of these two cases has been realized, the controller will command non-zero q-axis current below of a magnitude that is below the magnitude that will excite the bifurcation case for the particular motor. The resultant rotor velocity will expose which case has been expressed.

If a positive non-zero q-axis current is commanded, then an exhibition of positive rotor angular velocity will indicate that the true position of the rotor has been determined, whereas an exhibition of negative rotor angular velocity will indicate that $\theta_{foc}$ should be adjusted by 180°. If negative non-zero q-axis current is commanded then then results should be interpreted conversely.

By using an iterative process to incrementally determine to true position of the rotor's magnetic flux, the presently disclose apparatus and method is capable for very accurately and quickly calibrating internal permanent magnets for high-performance application without complex calculations or the consumption of excessive engineering time and/or other computational resources providing manufacturers with a valuable advantage in today's increasingly competitive market.

This disclosure teaches certain benefits in construction and use which give rise to the objectives described below.

A primary objective inherent in the above-described method and apparatus is to provide advantages not taught by the prior art.

Another objective is to accelerate manufacturing time of interior permanent magnet motors designed for high-performance applications by providing a quick and efficient apparatus and method for initial calibration that does not require the use of complex signal processing or carrier-signal generation techniques.

A further objective is to reduce the workload of calibration engineers tasked with calibrating interior permanent magnet motors designed for high-performance applications by providing a quick and efficient apparatus and method for initial calibration that does not require the use of complex signal processing or carrier-signal generation techniques.

A still further objective is to improve the consistency in motor controller calibration processes by providing a quick and efficient apparatus and method for initial calibration that does not require the use of complex signal processing or carrier-signal generation techniques.

Other features and advantages of the present invention will become apparent from the following more detailed description, taken in conjunction with the accompanying drawings, which illustrate, by way of example, the principles and features of the presently described apparatus.

BRIEF DESCRIPTION OF THE SEVERAL VIEWS OF THE DRAWING(S)

The accompanying drawings illustrate various exemplary implementations and are part of the specification. The illustrated implementations are proffered for purposes of example not for purposes of limitation. Illustrated elements will be designated by numbers. Once designated, an element will be identified by the identical number throughout. Illustrated in the accompanying drawing(s) is at least one of the best mode embodiments of the present disclosure. In such drawing(s):

Figure 5:
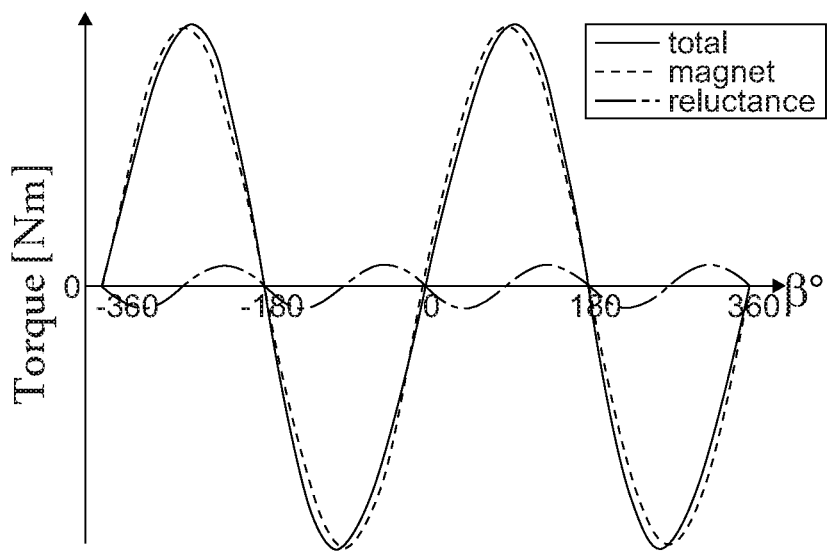

FIG. 5 is a diagram of the reluctance torque and the magnetic torque of an internal permanent magnet motor with low current illustrating that when the angle between the current vector and the rotor d axis (β) is between 0° and 90° and between 2700 and 360° the reluctance torque and the magnetic torque exhibit opposite polarity, but when p is between 90° and 270° the polarities are constructive, thus demonstrating the need for calibration in high performance applications.

Figure 6:
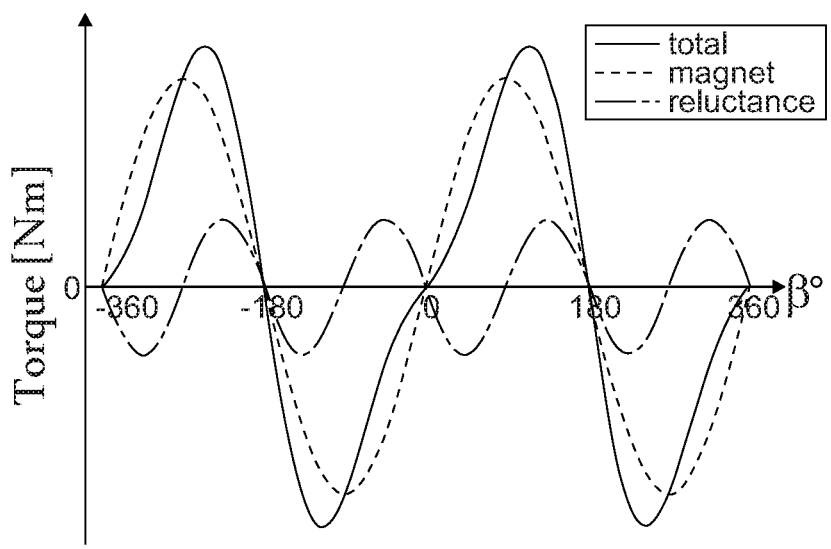

FIG. 6 is a diagram of the reluctance torque and the magnetic torque internal permanent magnet motor with current greater than that shown in FIG. 5 but below the level that would excite the bifurcation case demonstrating the increasing effect of the reluctance torque on the total torque distribution.

Figure 7:
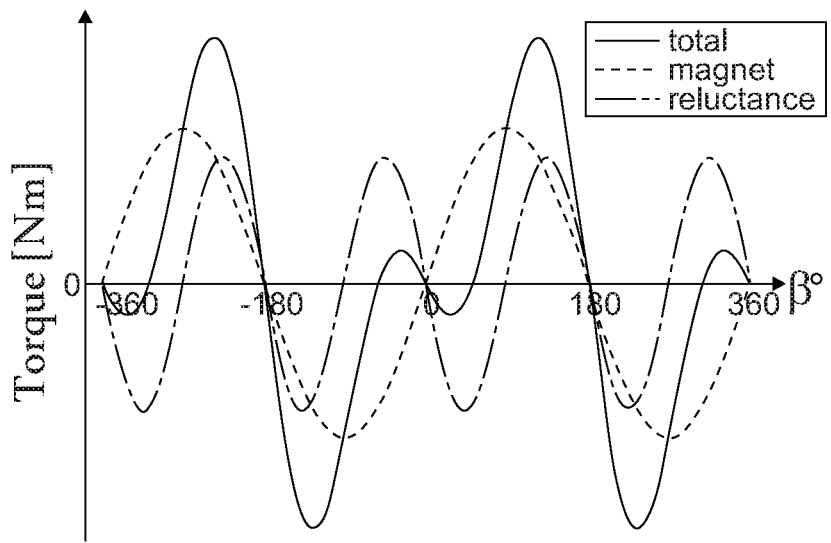

FIG. 7 is a diagram of the reluctance torque and the magnetic torque of an internal permanent magnet motor with current greater than that shown in FIG. 5 and FIG. 6 demonstrating the bifurcation case to emphasize that the presently disclosed calibration apparatus and method should utilize current lower than that which would excite the bifurcation event.

Figure 8:
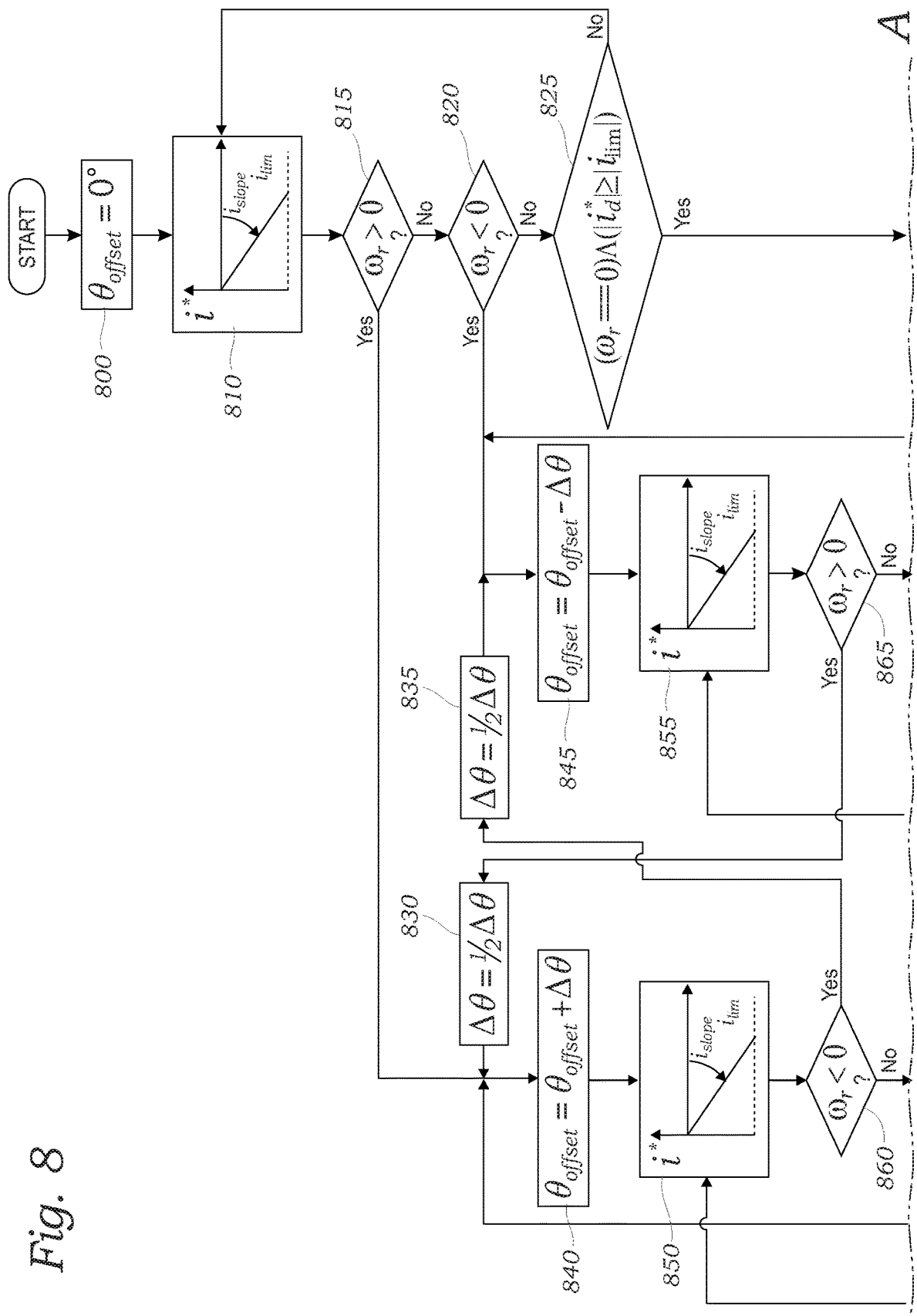

FIG. 8 is the top half of a detailed flow chart indicating the various processing steps and decision steps necessary to perform the presently disclosed calibration method.

Figure 9:
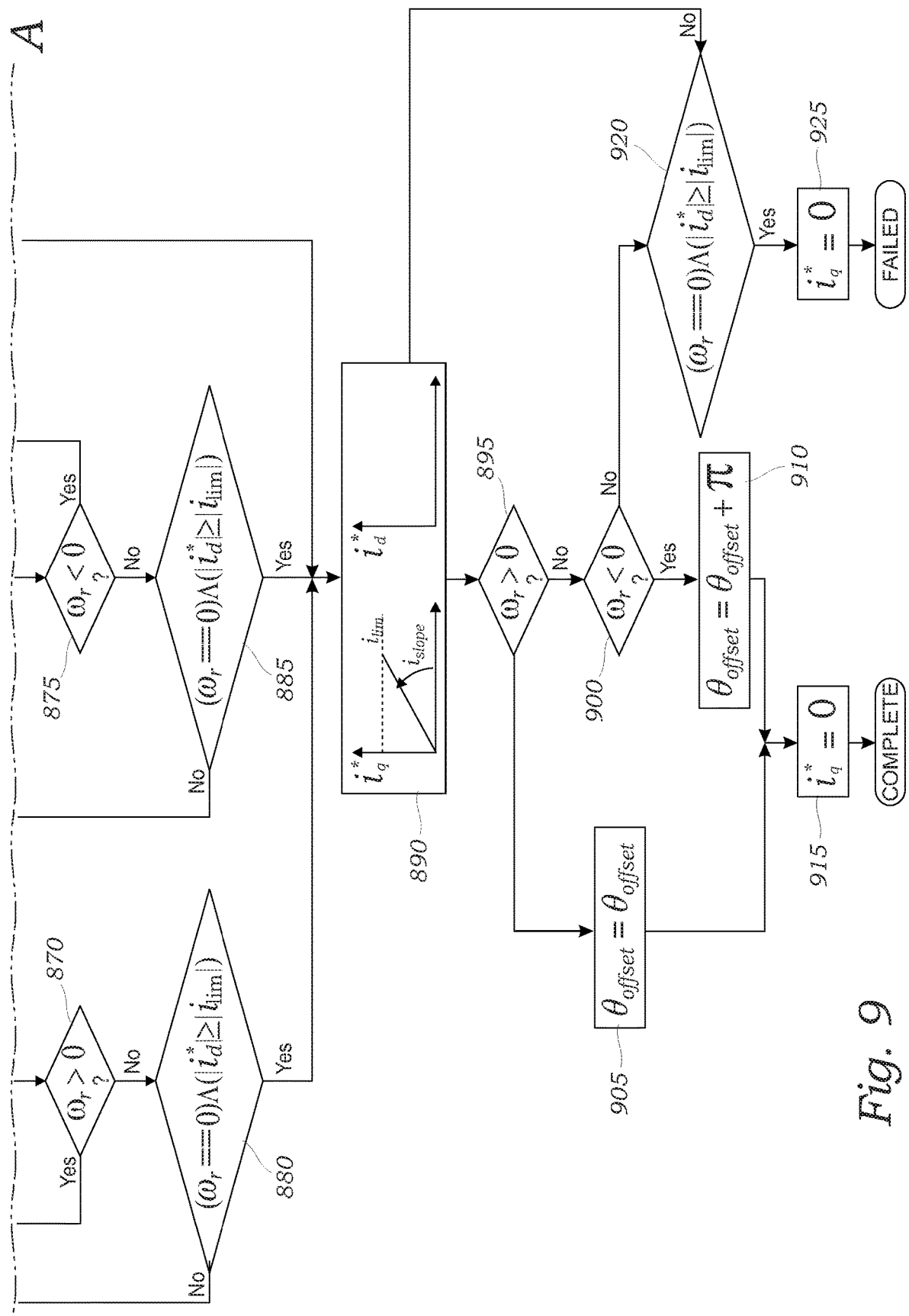

FIG. 9 is the bottom half of the detailed flow chart in FIG. 8 indicating the various processing steps and decision steps necessary to perform the presently disclosed calibration method.

DETAILED DESCRIPTION OF THE EXEMPLARY EMBODIMENT

The above-described drawing figures illustrate an exemplary embodiment of the presently disclosed apparatus and its many features in at least one of its preferred, best mode embodiments, which is further defined in detail in the following description. Those having ordinary skill in the art may be able to make alterations and modifications to what is described herein without departing from its spirit and scope of the disclosure. Therefore, it must be understood that what is illustrated is set forth only for the purposes of example and that it should not be taken as a limitation in the scope of the present apparatus or its many features.

Described now in detail are a series of drawings depicting various features and details for the purpose of further clarifying the presently disclosed apparatus and method.

Figure 1:
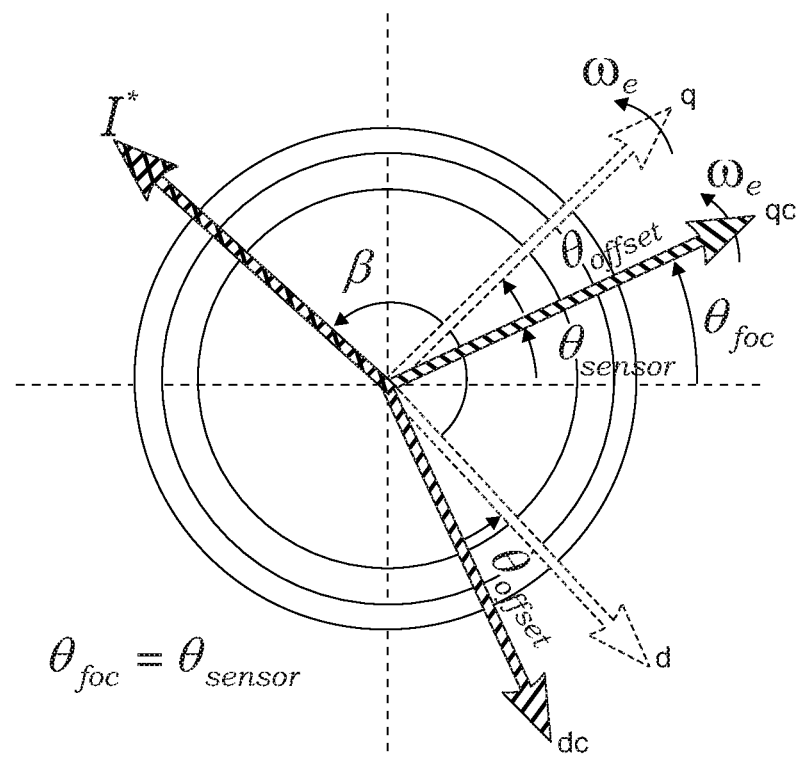
FIG. 1 is an axial diagram illustrating the disparity between the true magnetic flux vector of the rotor (θfoc) and the estimated magnetic flux vector of the rotor as indicated by the position sensor ($\theta_{sensor}$) of an uncalibrated interior permanent magnet motor showing the angle of error ($\theta_{offset}$).

FIG. 1 is an axial view of the rotor's true magnetic flux vector and the orientation of the rotor's magnetic flux according to the position sensor ($\theta_{sensor}$). This is the initial stage of the presently described method when the true rotor position ($\theta_{foc}$) is assumed to be equal to the rotor position reported by position sensor ($\theta_{sensor}$). However, from the illustration it is apparent that the rotor position as indicated by the position sensor ($\theta_{sensor}$) is incorrect by an error angle ($\theta_{offset}$).

Figure 2:
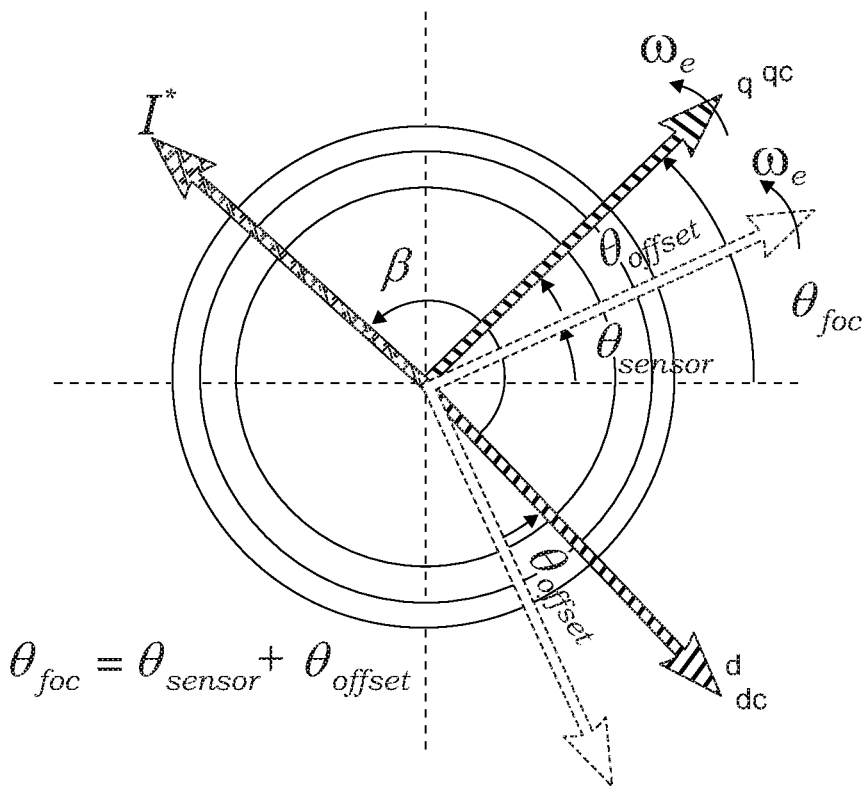
FIG. 2 is an axial diagram illustrating the disparity between the true magnetic flux vector of the rotor ($\theta_{foc}$) and the estimated magnetic flux vector of the rotor as indicated by the position sensor ($\theta_{sensor}$) of a calibrated interior permanent magnet motor showing the angle of error ($\theta_{offset}$).

FIG. 2 is the same axial view; however, in FIG. 2 the true rotor position ($\theta_{foc}$) is corrected by the error angle ($\theta_{offset}$). This illustration demonstrates that the true rotor position can be calculated by starting with the position according to the position sensor ($\theta_{sensor}$) and adding the error angle ($\theta_{offset}$) to it. Mathematically, it can be expressed as such: ($\theta_{foc}=\theta_{sensor}+\theta_{offset}$). The difficulty is determining the correct error angle ($\theta_{offset}$). It is this task that the presently disclosed method efficiently achieves through a successive iterative process of making small corrections and observing feedback.

Figure 3:
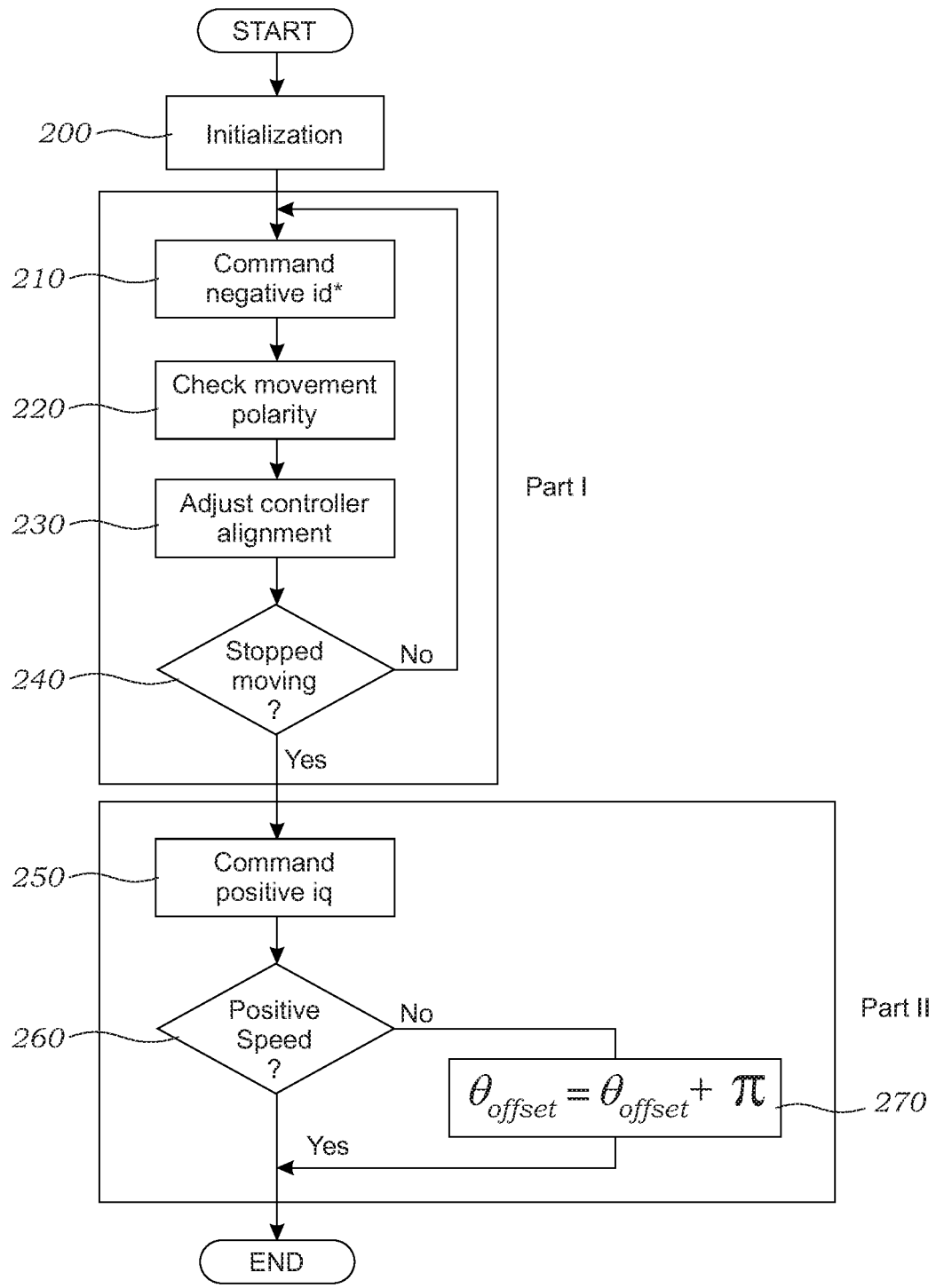
FIG. 3 is a simplified, high-level flow chart indicating the various processing steps and decision steps necessary to perform the presently disclosed calibration method.

FIG. 3 is a simplified flow chart indicating the various processing steps and decision steps that must be performed to calculate the error angle ($\theta_{offset}$). It begins with an initialization phase 200. At this stage, the true rotor position ($\theta_{foc}$) is assumed to be the position as indicated by the position sensor ($\theta_{sensor}$) and the error angle is assumed to be zero ($\theta_{offset}=0$).

Figure 4:
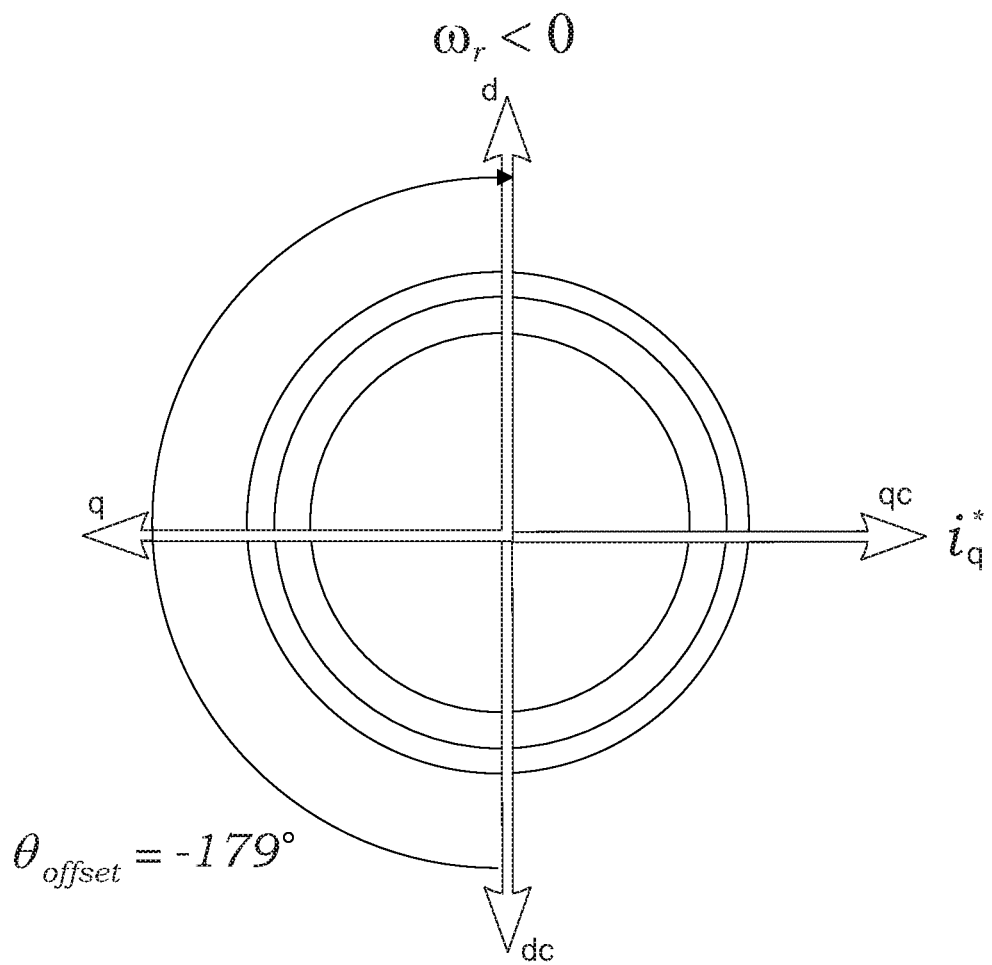
FIG. 4 is diagram illustrating the axial orientation of the magnetic flux vector of the rotor of an interior permanent magnet motor in a case where commanding non-zero d-axis current does not result in rotation because the offset error angle is close to 180°, thus necessitating the calibration confirmation step of commanding non-zero q-axis current.

Once these initial assumptions are made they must then be tested by commanding a non-zero d-axis current 210 and observing the physical reaction of the rotor 220. The error angle is then adjusted depending of the rotor response 230. If the non-zero d-axis current is negative and it causes the rotor express positive angular velocity (counterclockwise rotation) then the error angle ($\theta_{offset}$) will be increased by a pre-selected angle ($\Delta\theta$). If the rotor exhibits negative angular velocity (clockwise rotation) then the error angle ($\theta_{offset}$) should be reduced by the value of $\Delta\theta$. If positive non-zero d-axis current is commanded then the opposite polarity adjustments should be made. The variable $\Delta\theta$ is assigned an initial pre-selected value between 0° and 180°, preferably approximately 30°. Each time the rotor expresses opposing angular velocity $\Delta\theta$ should be reduced by a set percentage (preferably, approximately 50%) and the iterative process should continue using the newly reduced value of $\Delta\theta$, This procedure is repeated until the rotor expresses no motion in response to the commanded d-axis current vector. At which point, either the true position of the rotor's magnetic flux ($\theta_{foc}$) has been determined or it is off by exactly 180°. To distinguish between the two cases, a non-zero q-axis current is then commanded 250 and the rotor response is, once again, observed 260. If the commanded non-zero q-axis current is positive, then an expression of positive angular momentum (counterclockwise rotation) by the rotor is an indication that the true rotor position ($\theta_{foc}$) has been determined and the calibration is complete, whereas an expression of negative angular momentum 270 is the indication that ($\theta_{foc}$) should be adjusted by 180°. If the non-zero q-axis current is negative rather than positive then the angular velocity of the rotor should be interpreted conversely. FIG. 4 is an illustration of the latter case in which the rotor expressed negative angular velocity in response to a command of positive q-axis current.

FIGS. 5, 6, and 7 illustrate that the reluctance torque and the magnetic torque increasingly engage destructively as the magnitude increases. FIG. 7 illustrates the magnitude that excites the bifurcation case. For the purposes of this presently disclosed apparatus and method the commanded currents should always be of a magnitude less than that which would excite the bifurcation case.

FIGS. 8 and 9 illustrate a more detailed flowchart indicating the various processing steps and decision steps that must be performed to calculate the error angle ($\theta_{offset}$).

Beginning with the initialization step 800 in which the error angle ($\theta_{offset}$) is assumed to be zero, the presently disclosed procedure instructs to command negative non-zero d-axis current of a magnitude below that which will excite the bifurcation case 810.

The rotor response is then observed and if the rotor expresses positive angular velocity 815 then the error angle ($\theta_{offset}$) is increased by $\Delta\theta$ 840, if the rotor expresses negative angular velocity 820 then the error angle ($\theta_{offset}$) is decreased by $\Delta\theta$ 845, and if the rotor exhibits no angular momentum, then the method proceeds to the final step to determine if the error angle ($\theta_{offset}$) has determined the true position of the rotor's magnetic flux ($\theta_{foc}$) or a position that is 1800 off from the true rotor position 825.

Whether the procedure previously increased or decreased the error angle ($\theta_{offset}$), 840 or 845, the procedure instructs to, once again, command non-zero d-axis current 850, 855 and observe the resultant rotor reaction and make new adjustments accordingly 860, 865. This procedure repeats iteratively until the angular velocity of the changes polarity, in which case $\Delta\theta$ is reduced by a set percentage, 830 and 835, and the procedure continues once more using the newly reduced $\Delta\theta$ value until such time as the rotor expresses no angular velocity, 880 and 885. The set percentage by which $\Delta\theta$ is reduced can be any percentage less than 100% but through laboratory testing a percentage in the rage of 50% is recommended for calibration expediency.

Once the rotor exhibites no angular velocity in response to the non-zero d-axis current, the procedure has either properly determined the true position of the rotor's magnetic flux or identified a positon that is exactly 180 off from the true position. To identify which of these two possibilities has been realized, the procedure instructs to command non-zero q-axis current 890 and, once more, observe the rotor's response 895, 900. If the non-zero q-axis current was positive, then an exhibition of positive angular velocity is indicative that the error angle ($\theta_{offset}$) has been correctly determined and the true rotor position ($\theta_{foc}$) can be found by adding the error angle ($\theta_{offset}$) to the position sensor angle ($\theta_{sensor}$) 905, if the rotor exhibits negative angular velocity then the error angle ($\theta_{offset}$) is off by 180° and should be adjusted accordingly.

The enablements described in detail above are considered novel over the prior art of record and are considered critical to the operation of at least one aspect of the apparatus and its method of use, and to the achievement of the above-described objectives. The words used in this specification to describe the instant embodiments are to be understood not only in the sense of their commonly defined meanings, but to include by special definition in this specification: structure, material, or acts beyond the scope of the commonly defined meanings. Thus, if an element can be understood in the context of this specification as including more than one meaning, then its use must be understood as being generic to all possible meanings supported by the specification and by the word(s) describing the element.

The definitions of the words or drawing elements described herein are meant to include not only the combination of elements which are literally set forth, but all equivalent structures, materials or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, substitutions, now or later known to one with ordinary skill in the art, are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed:

1. A method of performing an initial calibration of an internal permanent magnet motor, said method comprising the steps of:
    A. Assigning the rotor an initial estimated position;
    B. Assigning the variable $\theta_{offset}$ an initial value of 0°;
    C. Assigning the variable $\Delta\theta$ an initial value positive value greater than 0° and less than or equal to 180°;
    D. Commanding a negative nonzero d-axis current of a magnitude below that which that will excite the bifurcation case for the particular internal permanent magnet motor, and identifying the resultant angular velocity ($\omega$) exhibited by the rotor;
    E. If the rotor exhibits an angular velocity in a direction opposite as a previous iteration of step D the variable $\Delta\theta$ should be reduced;
    F. If the rotor exhibits negative angular velocity ($\omega$), reducing the value of the variable $\theta_{offset}$ by the value of the variable $\Delta\theta$ and repeating the method from step D;
    G. If the rotor exhibits positive angular velocity ($\omega$), increasing the value of the variable $\theta_{offset}$ by the value of the variable $\Delta\theta$ and repeating the method from step D;
    H. If the rotor exhibits no angular velocity ($\omega$), commanding a current d axis of a magnitude below that which that will excite the bifurcation case for the particular internal permanent magnet motor, and identifying the resultant angular velocity ($\omega$) exhibited by the rotor; and
    I. If the rotor exhibits nonzero angular velocity ($\omega$), increasing the value of the variable $\theta_{offset}$ by 180°.

2. An apparatus of performing an initial calibration of an internal permanent magnet motor, said apparatus comprising the steps of:
    a controller in electrical communication with
    a power supply; and
    a motion sensor, said controller programmed to execute the steps of the method set forth in claim 1.

* * * * *